United States Patent [19]
Farnsworth et al.

[11] Patent Number: 6,144,470
[45] Date of Patent: Nov. 7, 2000

[54] HOLOGRAPHIC OPTICAL ELEMENT WITH CASTELLATED APERTURE

[75] Inventors: Stephen Wade Farnsworth, Loveland; Curtis Alan Shuman, Colorado Springs, both of Colo.

[73] Assignee: O. R. Technology, Inc., Boulder, Colo.

[21] Appl. No.: 08/805,106

[22] Filed: Feb. 24, 1997

[51] Int. Cl.[7] .............................. G02B 5/32; G02B 5/18; G01B 11/02; G11B 7/00
[52] U.S. Cl. ........................ 359/15; 359/566; 359/894; 356/356; 250/201.5; 369/109
[58] Field of Search ................. 359/15, 16, 19, 359/9, 566, 569, 575, 894; 356/356; 250/201.5; 369/44.26, 103, 109, 112

[56] References Cited

U.S. PATENT DOCUMENTS

| | | |
|---|---|---|
| 3,977,772 | 8/1976 | Rimmer et al. ................ 359/739 |
| 4,444,456 | 4/1984 | Jain et al. . |
| 4,776,652 | 10/1988 | Ih . |
| 5,121,371 | 6/1992 | Farnsworth et al. . |
| 5,212,572 | 5/1993 | Krantz et al. . |
| 5,249,080 | 9/1993 | Watson et al. ................. 359/894 |
| 5,315,417 | 5/1994 | Moss et al. .................... 359/15 |
| 5,410,468 | 4/1995 | Horinouchi . |
| 5,450,378 | 9/1995 | Hekker . |
| 5,530,565 | 6/1996 | Owen . |
| 5,546,371 | 8/1996 | Miyazaki . |
| 5,563,868 | 10/1996 | Farnsworth et al. . |
| 5,594,712 | 1/1997 | Yang . |

Primary Examiner—Jon Henry
Attorney, Agent, or Firm—Donald W. Margolis; Thomas E. Schatzel

[57] ABSTRACT

In an optical positioning system, a holographic optical element having a plurality of rectangular apertures has predetermined ones of its aperture edges castellated or notched in order to null out undesired light energy in target areas. The apertures may be fitted with diffraction grating patterns that may also be castellated for the same purpose. A method of using the aperture and grating pattern castellated holographic optical element is also provided.

2 Claims, 6 Drawing Sheets

HOLOGRAPHIC OPTICAL ELEMENT WITH CASTELLATED APERTURE

FIELD OF THE INVENTION

This invention generally relates to improvements in means and methods for reducing the effects of diffracted light energy impinging on undesired surface areas of an element.

BACKGROUND OF THE INVENTION

Continuing advances in disk drive storage capacities and speed have been greatly aided by concomitant improvements in the optical read/write head positioning systems they employ. Generally, a light source, holograms, lens and mirrors make up such optical positioning systems and provide the information needed by the drive's electronics to exactly position the head.

One such optical system is found in the a:drive, a disk information storage drive made by O. R. Technology Inc. of Campbell, Calif. A hologram will be found at the heart of the a:drive's optical positioning system. The hologram looks like a tiny piece of square shaped glass which contains a two dimensional image, usually developed by a computer program. The program and the hologram pattern accounts for light source efficiency, the optical characteristics of the various components involved in positioning the read/write head used in the drive system, the thermal dynamic character of those components and the drive's geometric characteristics.

A laser diode provides a source of coherent light that is used to illuminate the hologram. As light passes through the hologram apertures, it forms a pattern of six spots on whatever diskette is then resident in the drive. Three of the spots are used to position the head for 120 MB ultra high density (UHD) media and three are used for positioning the head with respect to 720 KB or 1.44 MB floppy diskettes. Each set of three spots actually contains two "striped" spots and a single spot that doesn't have any stripes. The so-called striped spots are themselves actually made up of several individual pin points of light which give the spot an overall appearance of being striped.

As light leaves the hologram, a lens focuses the spots and then a mirror splits the light in two directions; up and onto the surface of a UHD disk or down onto the surface of a encoder for use with respect to a high density disk. On the UHD media, the several stripes of light are projected over an equal number of the disk's data tracks and provide tracking information which is used to accurately position the read/write heads.

The non-striped spot, known as a modulation or "M" spot, is theoretically a steady, unvarying spot of incident light that measures the modulation and reflectivity of the UHD media surface as the intensity of the light returned from the modulation spot. That information is gathered by an appropriate detector and used by the system to compensate the striped spot readings for incident stray energy impinging on them. Unfortunately, stray or side lobe energy resulting from generation of the striped spot closest to the modulation spot was falling thereon causing the modulation spot to take on the ripple intensity characteristics of the nearby striped spot, thereby distorting the information the modulation spot conveys back to the servo positioning system. This prevents proper spacing of the spots, causing them to be kept further apart than is optimum for the servo system being used. Thus, the design choices in such prior art optical positioning systems was to move the spots closer together in spite of the undesirable stray energy that would impact the modulation spot and accept the resulting servo positioning errors or move the spots further apart to minimize or negate the stray energy problem and accept reduced servo tracking performance due to servo tracking errors.

Much of the spurious light noise that occurs is the result of edge diffraction caused by the sharp edges of the hologram's apertures. This is a known problem and efforts have been made in the past to compensate for such effects by rounding, tapering, serrating or smoothing a hologram's aperture edges. Unfortunately, such compensation efforts did not prove useful in helping solve the problems of spot adjacent noise described above.

On the other hand, holograms have been used in the past to correct for other unwanted effects in optical systems. For example, an optical head with two holographic elements adapted to provide primary dispersion compensation and secondary collimating or objective element compensation is described in U.S. Pat. No. 4,776,652 granted Oct. 11, 1988 to C. Ih. While not concerned with compensation for aperture edge induced diffraction errors, this patent does show the use of holograms to correct optical system errors. U.S. Pat. No. 5,121,371 issued on Jun. 9, 1992 and U.S. Pat. No. 5,563,868 which issued on Oct. 8, 1996, both show an optical servo system for a magnetic disk wherein light is passed through slits in a holographic optical element (HOE). No mention is made of aperture edge diffraction problems or compensation therefor although use of a HOE as part of a temperature compensation scheme is described.

Also, U.S. Pat. No. 5,315,417 issued on May 24, 1994 to G. Moss et al teaches the use of a hologram element as a spatial filter to block unwanted wavelengths. In a similar vein, U.S. Pat. No. 5,530,565 which issued on June 25, 1996 to H. Owen describes the use of a HOE as part of an optical bandpass filter. However, none of these prior art patents taught any manner of compensating for HOE aperture edge diffraction created noise.

SUMMARY OF THE INVENTION

It is, therefore a primary object of the present invention to provide an apertured holographic optical element that compensates for stray aperture edge energy.

It is an additional object of the present invention to develop a self-compensating holographic optical element that doesn't require redesign of the existing optical sensor system in which it is used.

It is a further object of the present invention to provide a self-compensating holographic optical element for which the compensatory changes do not unduly increase the cost of the holographic optical element.

In accordance with the present invention, there is provided a holographic optical element having a plurality of rectangular apertures therein which have predetermined ones of the aperture edges castellated. The apertures are fitted with diffraction gratings that may also have a castellated pattern. A method of using the castellated holographic optical element is also provided.

The invention has the following advantages over prior holographic optical elements and optical positioning systems.

According to the present invention, in an optical positioning system, a holographic optical element with castellated aperture edges and/or a grating having a castellated pattern is used to null out undesirable noise in one or more predetermined target areas. This permits sensing spots in the positioning system to be optimally spaced which, in turn, permits more accurate and responsive servo tracking control.

DESCRIPTION OF THE PREFERRED EMBODIMENT

Figure 1:
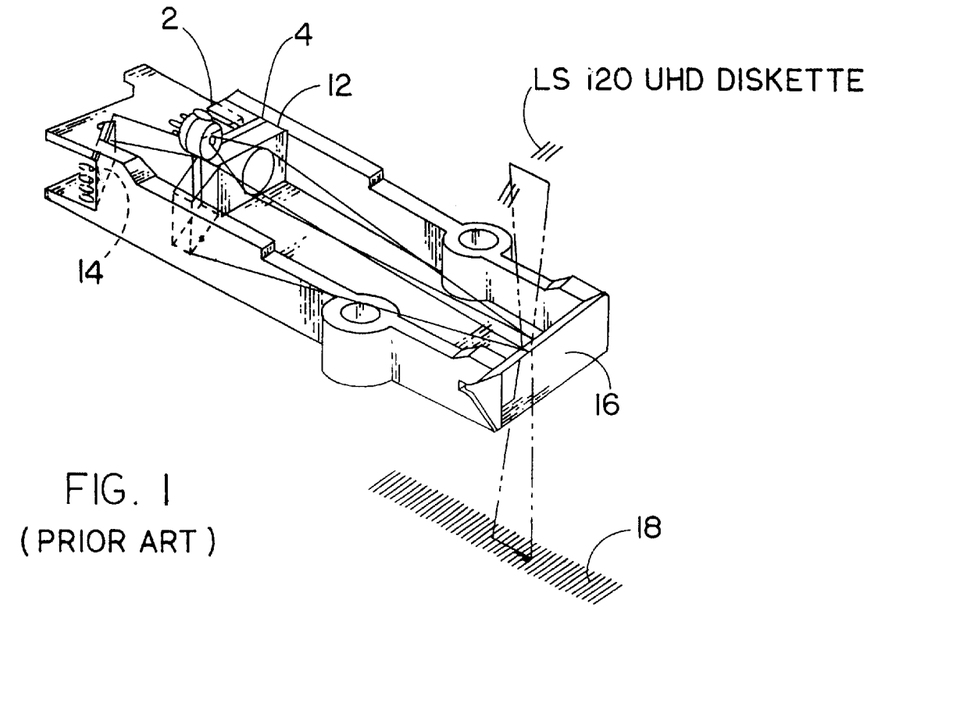
FIG. 1 illustrates a prior art information storage disk drive with an optical positioning system that includes a holographic optical element.

A prior art optical positioning system is shown in FIG. 1. The system includes a laser diode 2, a hologram optical element or HOE 4 having three apertures 6, 8 and 10 therein, a linear lens array 12, light detectors 14, a beam splitter (mirror) 16 and a linear encoder 18.

Figure 2:
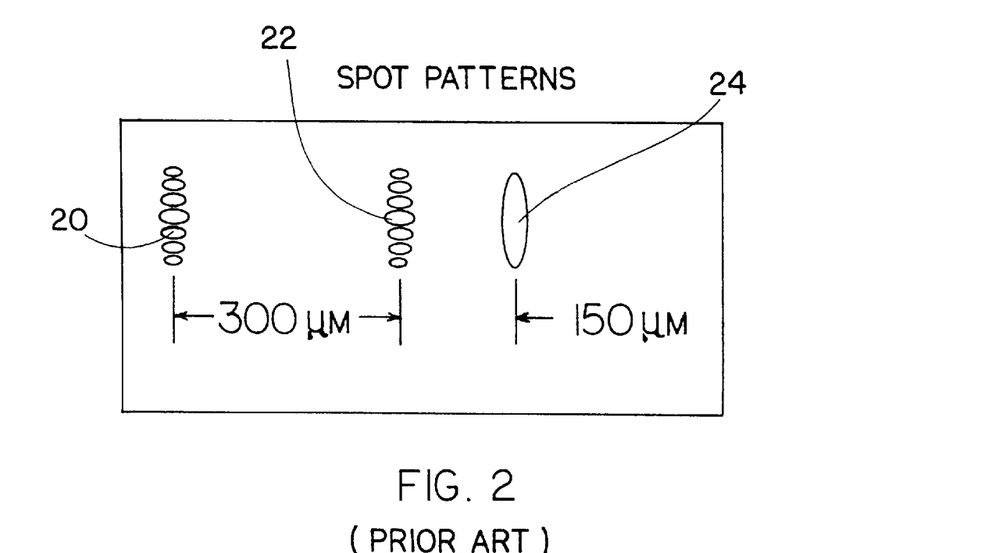
FIG. 2 shows typical spot patterns and spacing for the optical positioning system of FIG. 1.

The laser diode 2 provides a source of coherent light that is used to illuminate HOE 4. As light passes through HOE 4 and its apertures, it forms a pattern of six spots. Three of the spots are used to position the head for 120 MB ultra high density (UHD) media and three are used for positioning the head with respect to 720 KB or 1.44 MB floppy diskettes. Each set of three spots actually contains two "striped" spots 20 and 22 and a single spot 24 that doesn't have any stripes, as shown in FIG. 2. The so-called striped spots 20 and 22 are themselves actually made up of several individual pin points of light which give the spots an overall appearance of being striped. For purposes of this description, it is assumed that the number of stripes or pin points of light will be seven. That is a matter of design choice that is not part of the present invention.

As light is reflected from spots 20 and 22 on the UHD disk, it is passed to the light detector array 8 thereby providing quadrature positioning information that is used to drive the servo system that accurately positions the read/write head in the drive. Quadrature based servo positioning systems are well known in the art. An example of such a servo system can be found in U.S. Pat. No. 5,121,371.

Heretofore, spots 20 and 22 were located some 300 microns from each other. The distance between spots 22 and 24 was established at 150 microns. As shall be described hereinafter, use of the present invention permits the spots to be located closer together which improves overall servo positioning in the disk drive system.

As light leaves HOE 4, the lens array 12 focuses the spot pattern after which beam splitter or mirror 16 divides the light and sends it in two directions; up and onto the surface of a UHD disk (not shown) or down onto the surface of linear encoder 18 for use with respect to positioning of a high density disk. On the UHD media, the seven stripes of light are projected over seven of the disk's optical tracks and provide tracking information as the read/write head is moved transversely across optical tracks 26, which tracking information is then used to accurately position the read/write heads.

Figure 3:
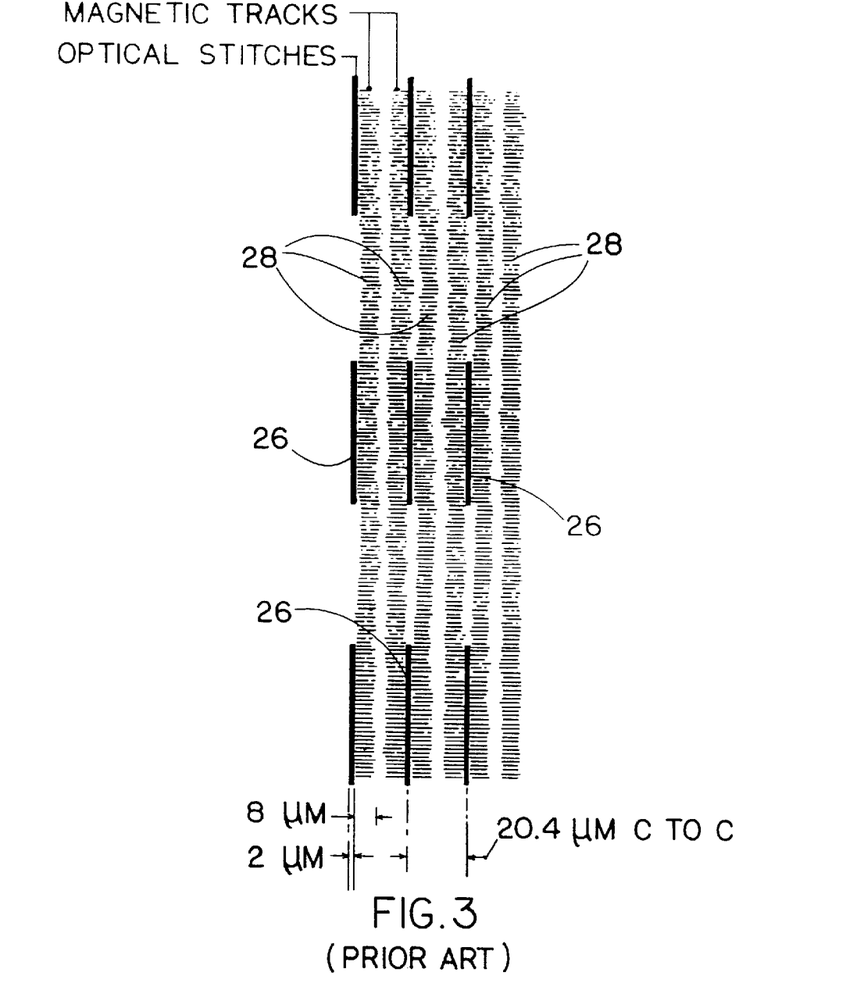
FIG. 3 depicts the servo and data track arrangement and dimensioning for a typical ultra high density disk.

At the factory, one surface of the UHD media is laser etched with a precise servo pattern of optical tracks that consist of several hundred, equidistant, concentric rings. The laser etching is intermittent, forming what are called "stitches" along the rings. As illustrated in FIG. 3, the optical tracks 26, which sandwich data tracks 28, have a predetermined constant pitch of 20.4 microns. That pitch is a matter of design choice. In this instance, this specific pitch is selected to match the spacing of the seven strips of light in spots 20 and 22 which are spaced apart from each other by 20.4 microns on center. Thus, each of the stripes will overlay a position on the media through which the optical tracks 26 will be rotated. The dark stitches under the seven strips of light absorb the incident energy as the media spins while the reflective areas between the stitches bounce it back.

Figure 4A:
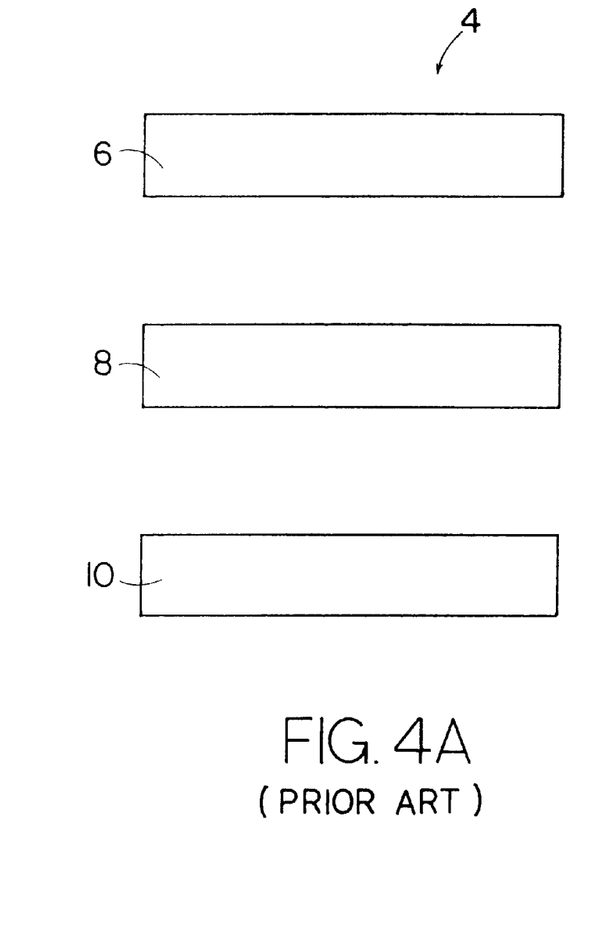
FIG. 4 shows a prior art holographic optical element having a plurality of apertures therein.
Figure 4B:
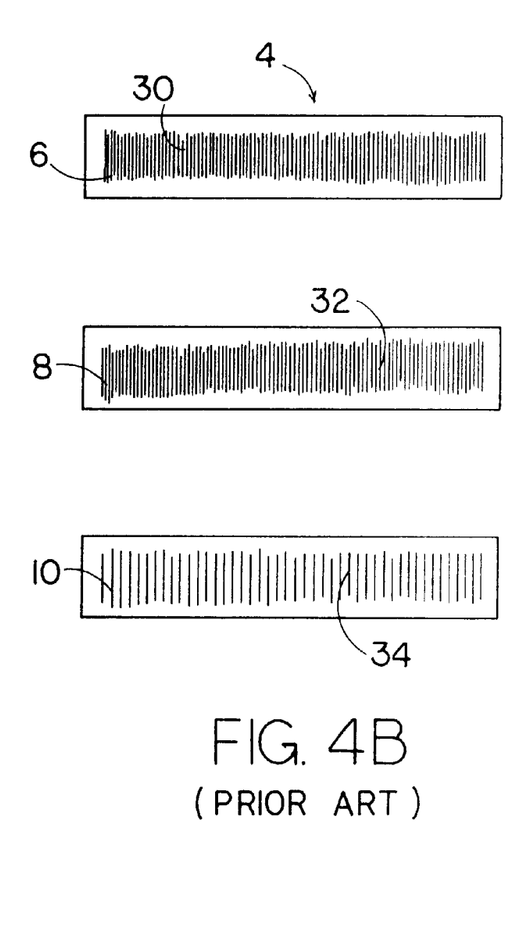
FIG. 4B shows a prior art holographic optical element having a plurality of apertures therein, each aperture having a diffraction grating with a fine pattern therein.

An enlarged view of the HOE 4 arrangement used by the prior art device is illustrated in FIGS. 4A and 4B. As shown in FIG. 4A, two apertures are used to form the modulated or striped spots 20 and 22. A single aperture would produce two unmodulated spots which is not appropriate for this application. When light is passed through HOE apertures 6 and 10, spots 20 and 22 are formed as shown in FIG. 2. The dimensions of apertures 6, 8 and 10 determine the height and width of the spots that are formed. The spot height will be inverse to the height of the aperture while the spot width will be inverse to the aperture width. Thus, the HOE apertures shown in FIG. 4A or 4B will produce tall and thin spots, as shown in FIG. 2.

Fine diffraction gratings 30, 32 and 34 are added respectively to HOE apertures 6, 8 and 10 as illustrated in FIG. 4B. Depending upon the pitch of the pattern used in each grating, the resultant spots 20, 22 and 24 can be moved to the right or left in the target area. The fine diffraction gratings also help to focus the beams that produce spots 20, 22 and 24.

The non-striped spot 24, also known as the modulation or "M" spot, measures the modulation and reflectivity of the spinning UHD media surface as the intensity of the light returned from the modulation spot. That information is gathered by an appropriate detector and used by the drive electronics to compensate the striped spot readings for incident stray energy.

TABLE I

| Spot | Control Signal | Contents |
| --- | --- | --- |
| 14 | Phase A | P, M, R |
| 16 | Phase B | P, M, R |
| 18 | None | M, R |

As indicated in Table I, the modulated light reflected back from spot 20, which is used to develop a Phase A quadrature signal, and from spot 22, which is used to develop a Phase B quadrature signal includes some phase information "P", as well as modulation information "M" and reflectivity information "R". When M and R are reported back to the servo control system by spot 24, they can readily be subtracted from the Phase A and Phase B signals to yield accurate servo control information. However, if some ripple energy from the striped spot beam 22 impinges on and becomes added to spot 24, the subsequent M and R information it then conveys is inaccurate and will cause servo position control errors.

It is the role of the modulation spot 24 to reflect back the amount of modulated and reflective light energy incident on the disk's surface so that this energy it can be removed from the modulated signals developed from light reflected back from spots 20 and 22.

The closer that modulation spot 24 can be located to the nearest information spot 22, the more accurately it will measure the incidental light falling on the disk surface near spot 22. However, the ripple energy broadcast by striped spot 22 and, to a lesser degree, the ripple energy broadcast by striped spot 20 impinges on spot 24 and prevents it from giving accurate compensation information to the servo tracking system. In order to avoid this problem, spots 20 and 22 are separated by a distance of 300 microns and spots 22 and 24 by 150 microns, as shown in FIG. 2. Thus, with the prior art HOEs, it wasn't possible to optimally position spots 20, 22 and 24 so that servo tracking would be most responsive and accurate.

Figure 5A:
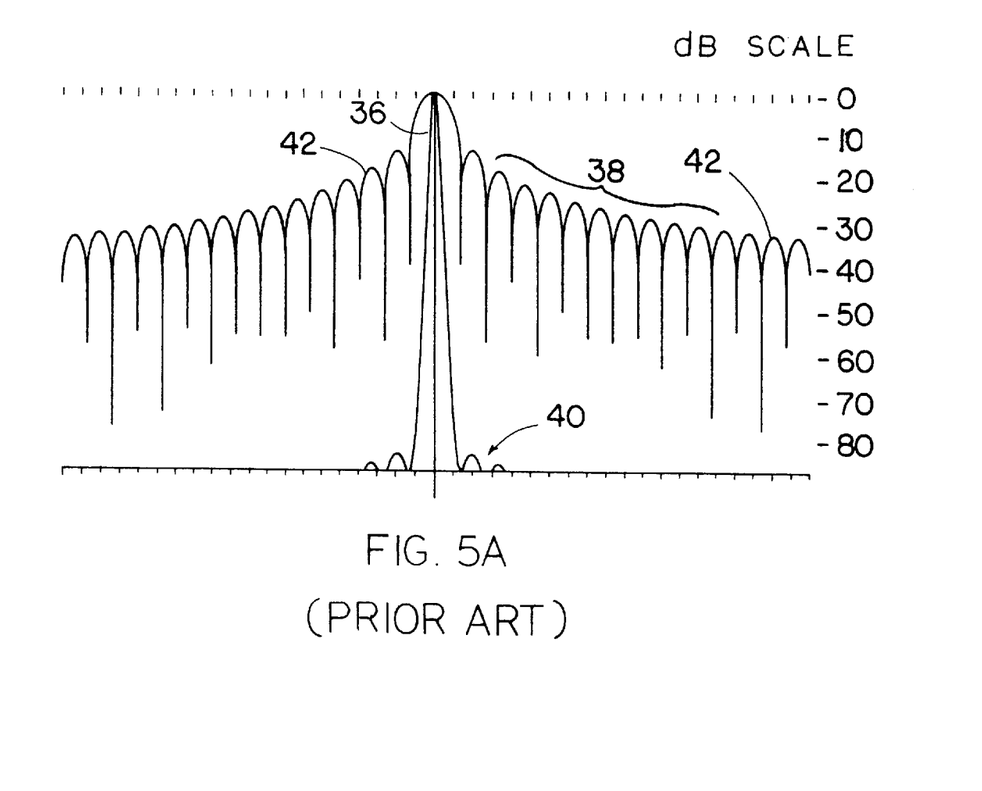
FIG. 5A shows a plot of a light spot incident on the target area of a disk surface after the light passes through the rectangularly edge shaped aperture of a prior art holographic optical element.

A graphic example of how the light energy used to form spot 22 is distributed is shown in FIG. 5A. In this arrangement, the HOE depicted in FIG. 4B is being used to form spots 20, 22 and 24. The peak value 36 of the light beam and its immediately adjacent side lobes form spot 22. Light beam profiles for spots 20 and 24 would look essentially the same.

Figure 6A:
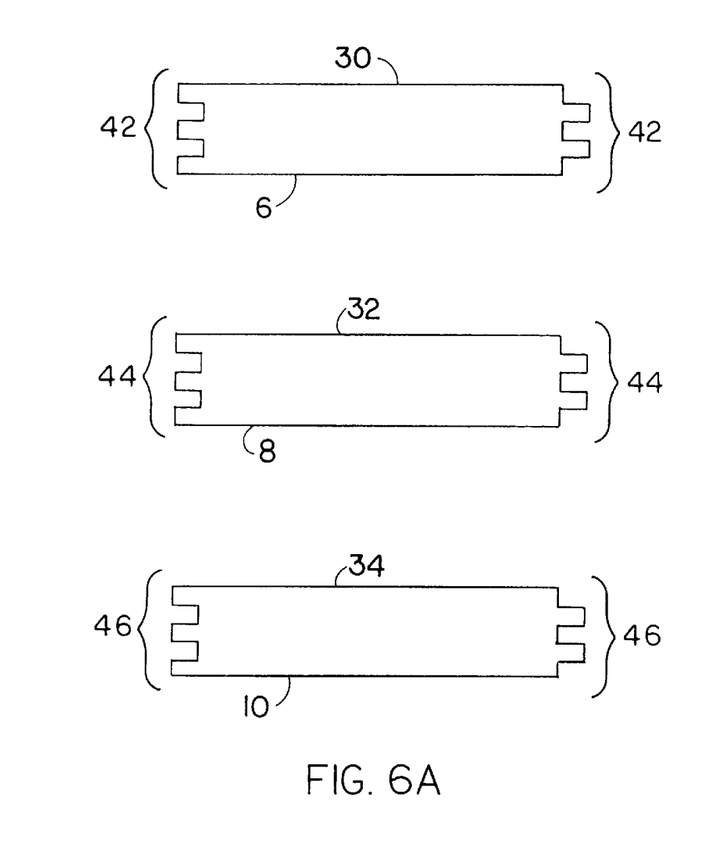
FIG. 6A depicts a holographic optical element with a plurality castellated edge shaped apertures and a fine pattern diffraction grating in accordance with the present invention.

As shown in FIG. 6A, both ends of HOE apertures 6, 8 and 10 are "castellated" or shaped like the rectangular notches in the top row of a castle wall. The castellations of the HOE apertures are identified respectively by reference numerals 42, 44 and 46. Generally, it is known, in an optical system forming diffraction point images, that the image size and shape and its side lobe structure is determined by the dimensions of the aperture that truncates the illumination field. Straight aperture edges give rise to sidelobe energy in the image plane arrayed in the direction perpendicular to the aperture edge.

The purpose of the present invention is to reduce diffraction scatter at a specific region relative to the image point in the horizontal direction or target area although the target area could just as well be in the vertical direction. In other words, as described hereinafter, the shape of the HOE aperture edges that are perpendicular to the axis of interest are changed according to the present invention to greatly reduce the sidelobe energy at a desired location along that axis of interest.

Figure 7:
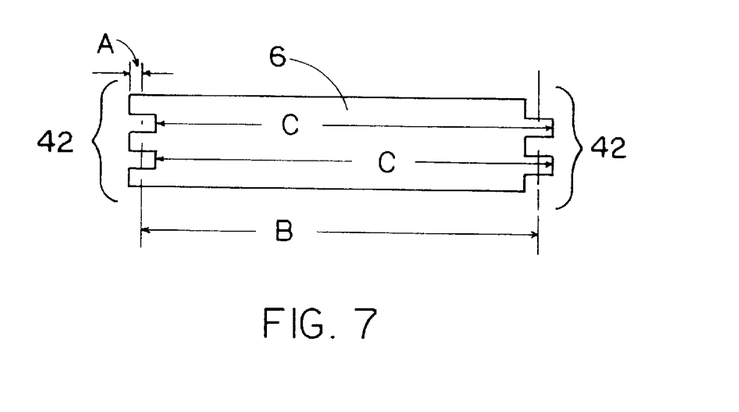
FIG. 7 illustrates the critical dimensions of the castellations.

The dimensions of the castellations, see FIG. 7, determine the effect the aperture's castellated end portions have on the beams they help form. In FIG. 7, only aperture 6 is depicted for the sake of clarity, but the dimensions identified are the same for the other HOE apertures 8 and 10. Dimension "a" is equal; to one-half the width of an individual cap of castellation 42 while dimension "b" is equal to the distance between the midpoints of the opposite castellations. It is important to note that the castellations 42 at each end of aperture 6 are alternately notched so that the distance "c" across the aperture between successive vertical castellations remains constant. This avoids phase shifts in the images produced and insures that the desired and appropriate null effect occurs.

Figure 5B:
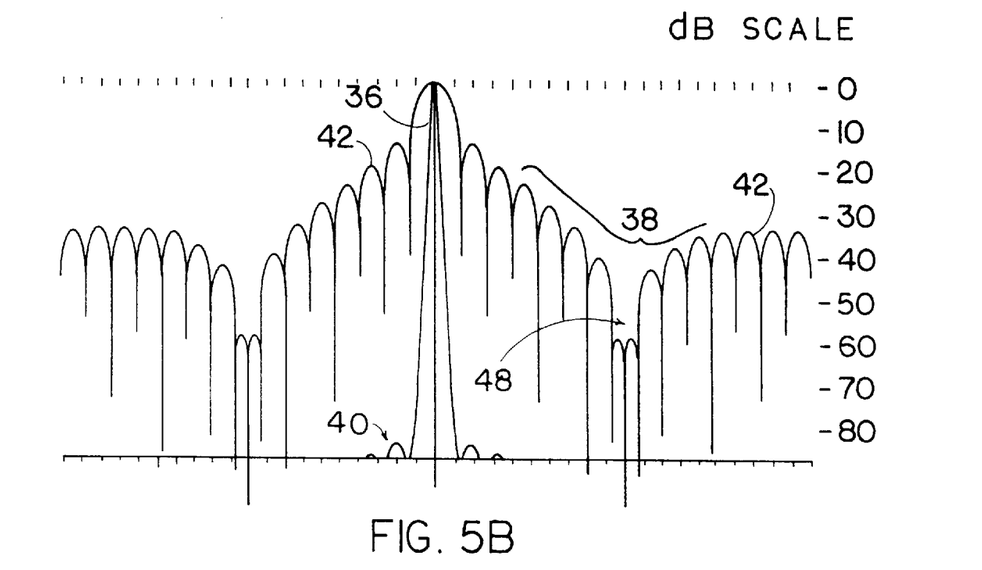
FIG. 5B illustrates a plot of a light spot incident on the target area of a disk surface after the light passes through the castellated shaped apertures of a holographic optical element according to the present invention.

A half-castle aperture ratio is defined as the quotient a/b. When light passes through a castellated HOE aperture, an interference null is created at a location that is dependent on the half-castle ratio. In FIG. 5B, for example, a half-castle ratio of 7.5 causes a null at location 48 on the illustrated plot. By appropriate selection of parameters a and b, the null can be moved to a desired location that coincides with the location of modulation spot 24 thereby canceling the stray ripple energy that otherwise interferes with readings from spot 24.

Figure 6B:
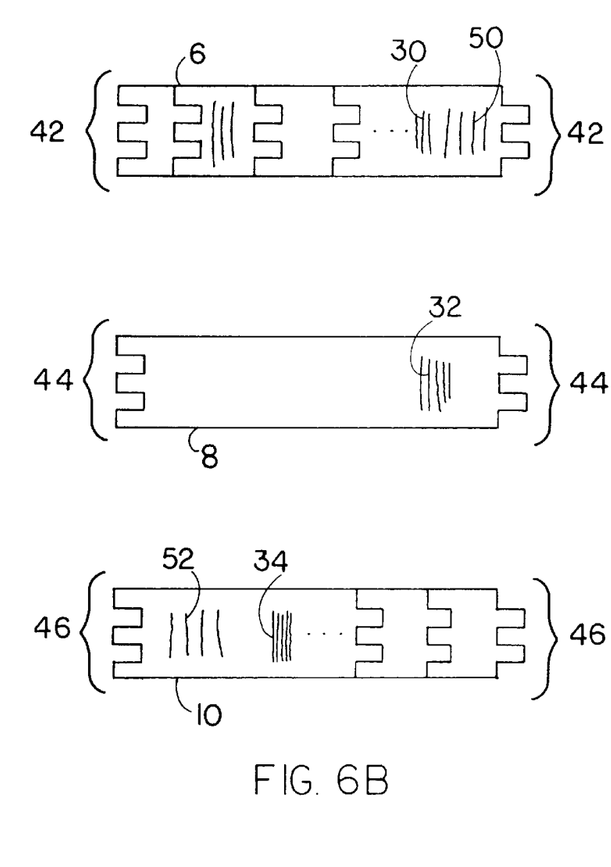
FIG. 6B shows a holographic optical element with a plurality castellated edge shaped apertures, a coarse castellated pattern diffraction grating and a fine pattern diffraction grating in accordance with the present invention.
Figure 8A:
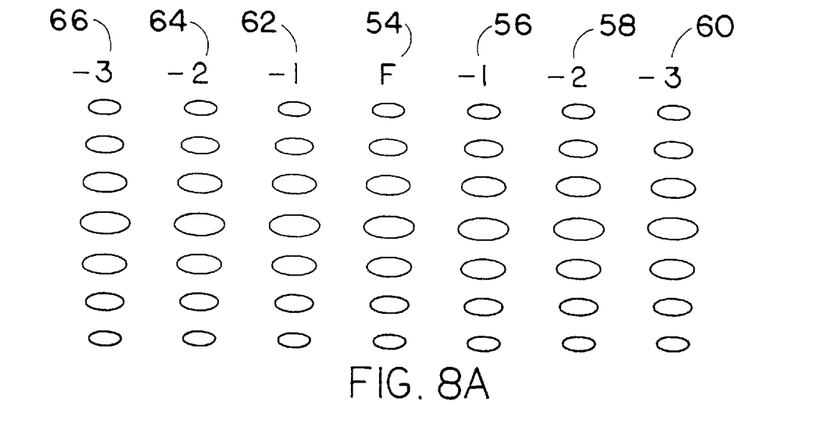
FIGS. 8A, 8B and 8C show the light spots as created on the surface of an ultra high density disk by using, respectively, an apertured holographic optical element without any diffraction grating, a coarse grating without a castellated pattern and a coarse grating with a castellated coarse pattern.

In addition to the fine gratings 30, 32 and 33 shown by representation in FIG. [6A] 6B, coarse gratings 50 and 52, also shown by representation are superimposed over apertures 6 and 10. The coarse gratings have a pitch that is less than or coarser than that of the fine gratings. Whereas fine gratings helped locate and focus the spot images, coarse gratings create odd order images from an original image canceling the even order images that would otherwise result. By addition of a uniform coarse grating spacing to the HOE apertures, additional images similar to the fundamental spot image 54 are created by the diffraction orders of the coarse grating. These duplicate images flank the original or "fundamental" image, as is illustrated in FIG. 8A, by the first three order "positive" spot images 56, 58 and 60 to the right and "negative" images 62, 64 and 66 to the left. In this instance, the terms positive and negative refer only to position and have also been identified in FIG. 8A, per conventional nomenclature of diffraction orders, as the +1, +2, +3, -1, -2 and -3 side lobe spot images.

In the preferred embodiment, the coarse gratings 50 and 52 have a pitch of from 40 to 45 microns. The pitch of the fine gratings has been selected to be one third of the pitch of the coarse gratings or about 13 to 15 microns. It is important to note that other pitches and pitch relationships for the coarse and fine gratings can and will be selected as a function of the dimensions and characteristics of each system in which a castellated HOE according to the present invention is used. Thus, the specific grating pitches and pitch relationships selected in the preferred embodiment should be considered as illustrative only and not as limiting the present invention.

Figure 8B:
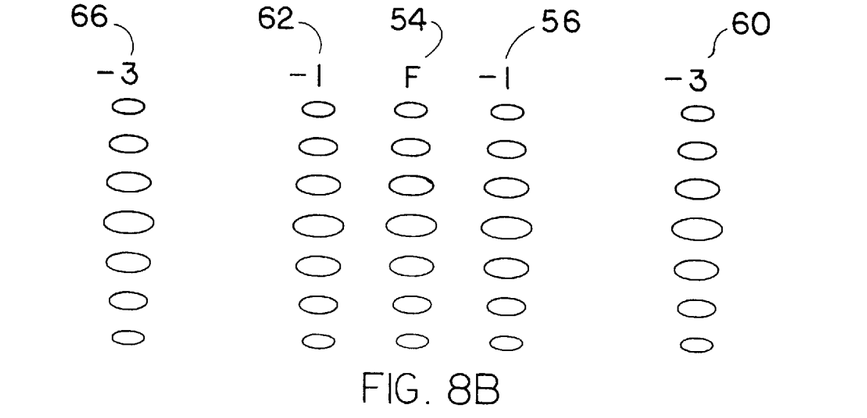

When the coarse gratings 50 and 52 have a 50% phase duty cycle, it causes the image structure shown in FIG. 8B, wherein all even order side lobe images are canceled leaving only the fundamental spot image 54 and the odd order side lobe images 56, 60, 62 and 64. When the phase image of the coarse gratings is set to 180 degrees, the fundamental image spot 54 is also canceled which is the special case in the prior art arrangement depicted in FIG. 2.

Figure 8C:
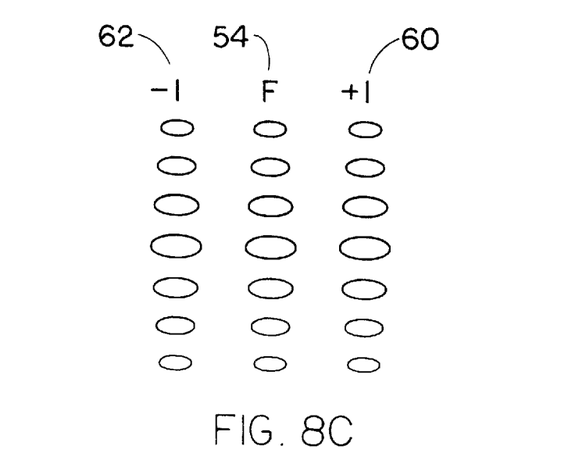

When the coarse grating is itself castellated, see FIG. 6B, the appropriate selection of the coarse grating castellations a and b dimensions permits those gratings to create a null at a desired location in the set of odd images it creates. In this instance, by appropriate selection of dimensions a and b, the coarse gratings are tuned to locate nulls at the third order image locations, thereby canceling them, see FIG. 8C, and significantly reducing the effect of incident energy at that location. In this arrangement, in accordance with the present invention, a and b values for the coarse grating castellations are selected to place the null point at the modulation spot 24 location, which also reduces the effect of spurious ripple energy from spot 22.

Thus, a HOE 4 having apertures with castellated ends and/or a castellated coarse gratings of appropriate dimensions can be used in a disk drive to improve system performance. The specific combination of castellation tuning used will be dictated by the characteristics of the optical positioning system being used, but the final result will improve the disk drive's servo tracking response and accuracy.

Although the present invention has been described in terms of the presently preferred embodiments thereof, it is to be understood that the disclosure, its specific details, representative devices and illustrative examples are not intended to be nor should they be interpreted as limiting the present invention. Various alterations and modifications will become apparent to those skilled in the art after having read the foregoing disclosure. Accordingly, it is intended that the appended claims be interpreted as covering all alterations and modifications as fall within the true spirit and scope of the present invention.

Having thus described our invention, what we claim as new, and desire to secure by Letters Patent is:

1. An optical positioning system, for moving a first element having location indicia on a surface thereof, with respect to a second element, which system comprises:

a) a coherent light source for illuminating an optical path in the system;

b) a plurality of light detectors positioned to receive light reflected from the first element;

c) a lens array positioned to receive light from said coherent light source and to direct light to predetermined ones of the indicia on the surface of the first element;

d) a servo system responsive to information produced by the first element location indicia for positioning the first and second elements relative to each other in accordance with signals derived from the first element location indicia; and e) a holographic optical element, positioned in the optical path to direct light to predetermined ones of the first element location indicia, having a plurality of apertures therein with castellations formed on predetermined one or more of aperture edges to create a light energy null at an intended target location.

2. The system according to claim 1 wherein the width and height of holographic optical element's aperture edge castellations are determined as a function of the location at which a light energy null is intended.

* * * * *